Dec. 15, 1942.  A. A. MAXIMOFF  2,305,180
DIRECTION INDICATOR OR SIGNAL DEVICE FOR AUTOMOBILES
Filed Feb. 16, 1940  2 Sheets-Sheet 2
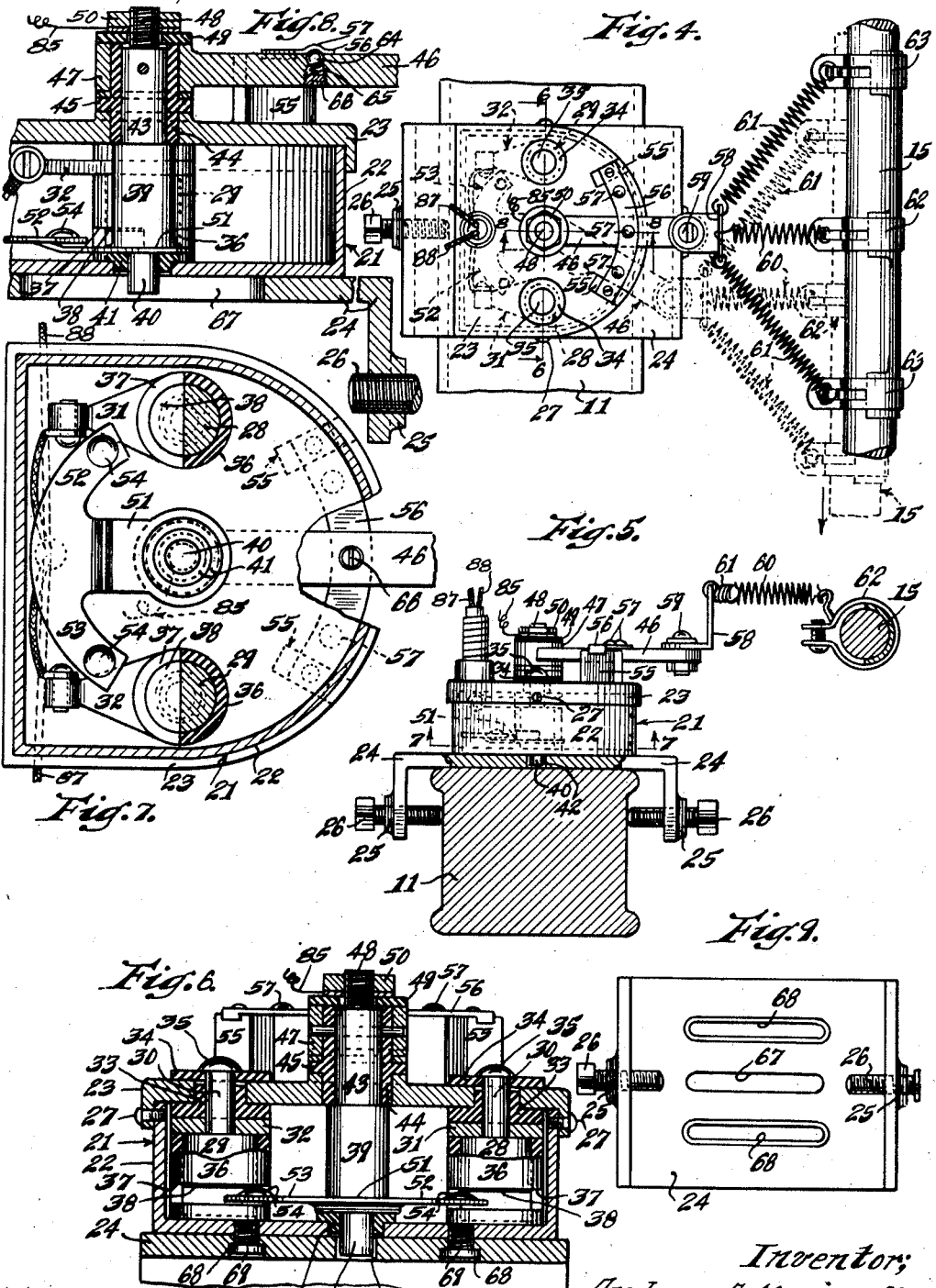
Witnesses:
E. E. Wessels
Madeline E. MacMaster
Inventor:
Andrew A. Maximoff,
By Joshua R. H. Potts
his Attorney.

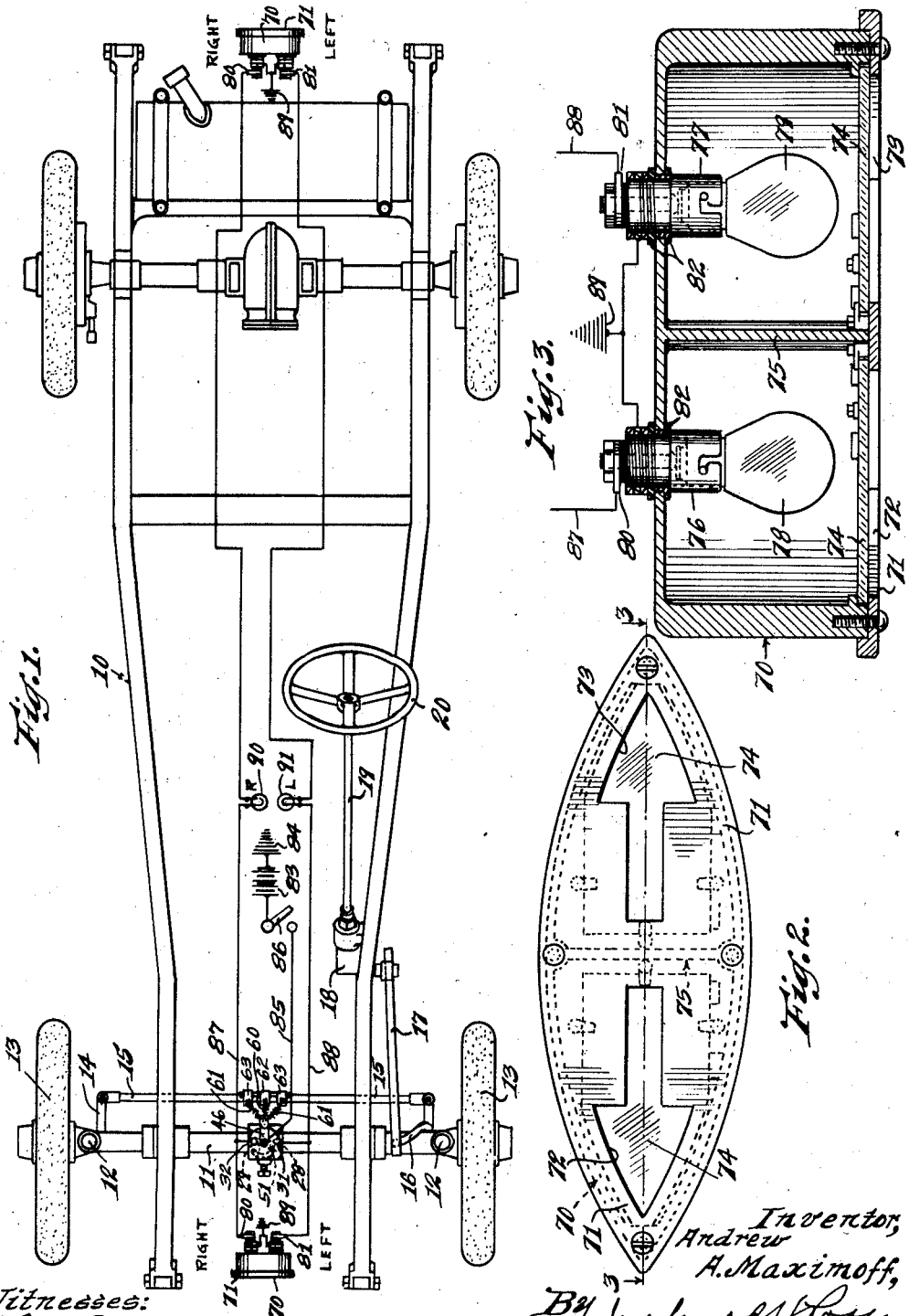

Patented Dec. 15, 1942

2,305,180

UNITED STATES PATENT OFFICE 2,305,180

DIRECTION INDICATOR OR SIGNAL DEVICE FOR AUTOMOBILES

Andrew A. Maximoff, Chicago, Ill., assignor of one-half to James C. Macak, Chicago, Ill.

Application February 16, 1940, Serial No. 319,269

3 Claims. (Cl. 200—59)

This invention relates to direction indicators or signal devices for automobiles, and more particularly to electrical signals or lights adapted to operate from a switch, preferably automatically, upon turning the steering wheel and gear of the front wheels to notify or warn other drivers in front and in rear or pedestrians of the intention to turn to either side and to indicate by illuminating arrows pointing to the right or left respectively as the case may be, so as to be broadly discernible to other drivers or pedestrians at a glance so that their movements may be directed accordingly to facilitate traffic regulation and as a safeguard against accidents and collisions.

The invention also has for an object to provide a novel and simple circuit arrangement and switch for operating the signals of novel and simple form, and to provide a novel connection and mounting of the switch on the front axle and with the cross connecting rod between the arms extending rearwardly from the steering knuckles of the front wheels forming part of the steering gear to be operated in the corresponding direction in which the vehicle is turned but opposite to the movement of the rod, but to maintain the same normally in a neutral position when traveling straight at which time the signals are off or extinguished, and to compensate for and allow movements of the rod and steering gear beyond that required to operate the signals without interfering with the operation thereof or placing unnecessary or increased pressure, stress or strain on any of the parts of the steering gear or switch and particularly the contacts of the latter.

The invention also embodies a novel switch, switch box or casing provided to be mounted on the front axle and containing an arm with a sector or arcuate contact portion cooperating with fixed contacts through the medium of contact making brushes or terminals at either side, with means for connecting and operating said sector with the steering rod, means to limit the movements of the arm, and means to engage and hold the arm in a neutral or central position when the electrical circuit is open by reason of the contacts of the switch being out of engagement and the signals inoperative or extinguished and to either side thereof when engaged and operative to actuate the signals as desired and according to the direction of movement or turning of the vehicle from outer to inner lane or vice versa or to left or right as will be readily appreciated.

These and other objects and advantages of the method of construction employed will appear more fully in the hereinafter specification when taken in connection with the accompanying drawings in which, Figure 1 is a plan view of an automobile chassis equipped with the turning signal device or direction of movement or travel indicator.

Figure 2 is a front elevation of one of the signal housings or direction indicators proper, enlarged.

Figure 3 is a horizontal section taken on the line 3—3 of Figure 2.

Figure 4 is a plan view of the switch and associated parts.

Figure 5 is a sectional side elevation thereof.

Figure 6 is an enlarged vertical section taken on the line 6—6 of Figure 4.

Figure 7 is a horizontal section taken on the line 7—7 of Figure 5, but showing a modification.

Figure 8 is a fragmentary vertical section taken on the line 8—8 of Figure 4, of the modified form, and Figure 9 is a plan view of the modified form.

Referring more particularly to the drawings, 10 designates an automobile chassis frame, 11 the front axle, 12 the steering knuckles, 13 the front or steering wheels, and 14 the arms extending rearwardly from the knuckles and front spindles in the usual way. These arms are connected by a transverse rod 15, designed to be shifted by connection with an operating arm 16, or other suitable connection from a link 17 connected to the steering gear 18, having the usual standard or post 19 and steering wheel 20. This mechanism is of conventional or any desired construction employed in standard automobiles or similar vehicles.

The signal device includes a switch housing 21 of any suitable construction, but preferably stamped from sheet metal and including a casing part which when arranged in the position shown forms the base, and is engaged by a cover 23, flanged as shown or otherwise attached thereto. This casing may be arranged upon the front axle 11, or mounted beneath it, as desired, in which event the casing or housing is inverted. It is secured to and held in position as by means of a U-clamp 24, the leg portions of which are provided with threaded apertures with surrounding bosses 25, the threaded apertures receiving clamping screws or the like 26, adapted to engage opposite faces of the axle to removably hold the switch housing in position and permit adjustment thereof transversely of the axle, that is, forwardly or rearwardly as well as longitudinally, so that it may be properly positioned with respect to the connecting rod 15. The cover 23, or the sections of the casing are shown held in position by suitable fastenings such as screws 27.

Mounted within the casing are a pair of conductor posts forming contacts 28 and 29 having reduced shank portions 30 mounted in apertures in the casing and having terminal connectors 31 and 32 fitted on the shank portions for attachment of the wiring constituting a part of the electrical system or of the circuits for the direction indicators or signal devices as will be further described. These terminals are insulated from the casing as by discs and sleeves 33, at the inside, and in the apertures and at the outside by means of washers 34, all the parts being secured in position in any suitable way and clamped to the casing such as to the cover 23, as shown more particularly in Figure 6 of the drawings as by upsetting the ends of the shanks 30 as indicated at 35. The terminals 28 and 29 have insulated cylinders 36 mounted thereon to support the connectors and provided each with a slot 37 registering with slots 38 in the posts 28 and 29. A shaft 39 has a reduced portion 40 journaled in the casing in an insulated bearing number 41 in conjunction with an opening 42 in the clamp 24 to electrically separate the shaft from the casing and clamp, and the opposite end or top in the form shown is reduced as at 43 to take an insulation sleeve 44, which also enters an opening in the cover and insulates the shaft from the casing. Discs or ribs 45 may be provided on the sleeve 44 and an arm 46 is fixed or keyed to the reduced portion 43 of the shaft over the sleeve 44 against the ribs or flanges 45 through the medium of a hub 47. The shaft 39 has a reduced threaded portion 48, and an insulation disc 49 fits thereon against the sleeve 44 and hub 47, and is engaged by a nut and washer 50. In this way it may serve as a terminal for connection of a wire or conductor of the circuit. The shaft 39 is provided with an arm 51, forming a movable contact member having an arcuate contactor arm at the free end thereof having resilient contact portions or brushes 52 and 53 shown provided with beads 54 for this purpose and adapted to enter the slots 37 and 38 to make electrical connection with either of the posts 28 and 29 or to remain out of contact therewith in a normally neutral or central position. It should be noted that the operating arm 46, and the movable contact arm 51 extend in diametrically opposite directions and radially of the casing and are limited in their movements by means of stop lugs 55 shown formed on the cover or secured thereto in substantially radial positions parallel with equi-distantly spaced from the arm 46 when the latter is shifted to either side according to the direction of turning or oscillation of the arm. A spring strip 56 is mounted on the lugs 55 and has three ball depressions 57 forming notches or seats in this arcuate strip for a purpose to be hereinafter made apparent. An angle member 58, is pivotally mounted on the arm 46 on a vertical axis as at 59, and is suitably apertured in the vertical extending wing thereof for connection with a central coil spring 60 and springs 61 diverging from each side thereof for connection to the rod 15, preferably at spaced points through the medium of a central clamp 62 and clamps 63 equidistantly spaced apart at each side thereof on the rod 15 for the purpose of normally holding the parts in a central or neutral position with the brushes out of engagement with the stationary contacts and posts 28 or 29 but adapted in conjunction with the pivoting action of the connecting member 58 to permit continued shifting of the connecting rod 15 of the steering gear in steering the vehicle as said rod moves toward and away from the axle, after the arm 46 has been engaged with either one of the stops 55 to operate the signals, as will be later described. This compensating connection is important in that it normally holds the signals in inoperative position and the contacts out of engagement as well as to take up any looseness between the parts without interference with the movements of the steering gear although the signals, by reason of operation of the switch will be operated and illuminated at any desired degree of turning of the steering wheel according to the manner in which it is adjusted.

The arm 46 carries a ball or other spring pressed catch or pawl 64 pressed by the spring 65 held in an opening or threaded bore in the arm and adjustable by means of a screw plug 66 threaded therein, which also serves to retain the parts in position. This ball engages the depressions 57 to hold the arm in central position or at either side adjacent or in contact with the stop lugs 55 when moved to operate the signals for a turning or deflection of the vehicle to the right or left as the case may be. In Figure 5 of the drawings a circular opening 42 is provided in the clamp for the end of the shaft 39, but in Figures 6, 8, and 9 an elongated slot 67 is shown in lieu of the circular opening for the purpose of receiving the shaft end 40 and corresponding parallel slots 68 are provided in the clamp 24 at either side thereof to take the reduced or shank portions of suitable connectors to permit adjustment of the housing or casing with respect to the clamp according to the size and type of axle employed and also according to the spacing of the connecting rod 15 with respect to the axle so as to adapt the device to any make of car. The casing 22 is substantially circular with one side flattened as a chord of an arc or otherwise as seen in Figs. 4 and 7. Where the slots 67 and 68 are employed set screws 69 are extended through the slots 68 to connect with the bottom of the casing 22 to adjustably connect the clamp and casing.

The signal devices are preferably mounted at the front and back of the vehicle at any suitable position and are in the form of oppositely tapered or lenticular shaped housings 70 having covers 71 shown secured in position by screws or otherwise and bearing arrow shaped openings 72 and 73 pointing in opposite directions, that is to the right and left with the heads conforming to the shape of the tapered ends of the housing and having translucent glass panels 74 which may be suitably colored preferably orange or yellow in back thereof. The housing is divided by a vertical partition 75 into two independent compartments at each side thereof and the back wall of the housing has sockets 76 and 77 mounted thereon, but insulated therefrom to receive lamps or electric bulbs 78 and 79. The housing means of the sockets form terminals 80 and 81 with suitably threaded shanks and nuts for clamping the parts in position and connection of the wiring. The device is preferably arranged to take one point bulbs in which the plug forms one side of the circuit and the insulation is indicated at 82. The usual battery on the automobile is designated at 83 and is grounded as indicated at 84 to the frame and body of the car. A conductor 85 extends from the other side of the battery with an interposed switch 86 for opening and closing or controlling the circuit and this switch may be the usual ignition switch of the automobile. Conductors 87 and 88 connect to the terminals 80 and 81 of the lamps at the front and rear to the respective right and left signals or direction indicators constituted by the arrows or other insignia designating direction of movement or turning of the vehicle. The housings are also grounded to the frame and body as at 89, and the conductors 87 and 88 have interposed right and left hand pilot lamps 90 and 91 to designate when the signals are operating and the direction indicated thereby for which they may be suitably marked to be readily visible to the driver of the car, although it is here explained that when the steering wheel is turned so as to turn to the right the signals indicating a right turn will be placed in circuit by opposite movement of the arm 46 with the connecting rod 15 of the steering gear and in the opposite direction when the steering wheel is turned to the left to cause the car to turn to the left in which instance the contact arm 51 and brushes 52 and 53 will be moved into engagement with either of the posts 28 and 29 constituting the stationary contacts of the switch connected to the conductors 87 and 88 to close the circuit through either as desired, but operating automatically upon the actuation of the steering mechanism. The circuit is completed by connecting the conductor 85 with the movable contact at the arm 46 or shaft 39 through the medium of the nut and washer 50 forming a terminal as it is thought will be apparent.

The switch housing 22 is spot-welded or otherwise secured or engaged rigidly with the U-clamp 24 except in the form provided with the slots 67 and 68 where these parts are adjustable relatively, as shown in Figures 6, 8, and 9. The clamps 62 and 63 are rigidly connected by a strip engaging and fitting the connecting or throw rod 15 as shown in Figures 4 and 5, the strip having lateral extensions forming or secured to the clamps in any suitable way. These clamps are punched out to provide hooks or other suitable formation for connection of the springs 60 and 61 thereto as also shown in Figures 4 and 5.

In the operation of the device, when the switch 86 is open no current can flow and the device is inoperative. However, when this switch is closed as by turning on the ignition of the automobile and when a turning is made to the right, the rod 15 will move to the left or opposite direction and the contact arm 51 will be moved to the right so that the contact 52 will engage the post 28 at the slot 38 and close the circuit through the ground, conductor 85, conductor leading from post 28 to conductor 87 to the respective right hand lamps 78 which will be illuminated together with the pilot light 90. When a turning is made to the left, the contact 53 of arm 51 will be similarly moved to the left to engage the post 29 and close the circuit to the left hand lamps 79 through the conductor leading from the post 29 to the conductor 88 in addition to the conductor 85 and the ground and at the same time illuminate the left hand pilot light 91 on the dash or other suitable places where it may be readily seen by the driver of the car.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a device of the character described, the combination of a vehicle axle and the transversely shiftable steering rod adjacent thereto, with a switch including an actuating arm having means for mounting the switch upon the axle and having three positions including intermediate neutral and circuit closing positions on each side thereof, means to prevent movement of the switch beyond the latter positions, a pair of resilient members each pivotally connected at one end to said switch actuating arm, and at their other ends pivotally and adjustably connected at spaced positions to said steering rod to operate the switch upon movement of the latter and permitting movement of the rod free of the switch beyond the circuit closing positions, an arcuate strip spanning said actuating arm and provided with depressions contiguous to said arm when the switch is at either of the three above mentioned positions, a spring pawl on said arm adapted to engage said depressions and means for adjusting the tension of said spring pawl.

2. In a device of the character described, a vehicle having an axle and a steering gear connecting rod movable transversely of the vehicle, a U-clamp comprising a plate spanning said axle and having depending portions spaced therefrom, clamping screws extending through said depending portions and engaging said axle, a switch mounted for adjustment on the said plate transversely of the axle, said switch having stationary contacts and a movable contact with an operating lever, and an actuating connection between said lever and said connecting rod.

3. In a device of the character described, a vehicle having an axle and a steering gear connecting rod movable transversely of the vehicle, a U-clamp comprising a plate spanning said axle and having depending portions spaced therefrom, clamping screws extending through said depending portions and engaging the axle, said plate having slots therein transverse to said axle, a switch box having set screws engaging through said slots, said switch box having stationary contacts and a movable contact with an operating lever, and an operable connection between said lever and said connecting rod.

ANDREW A. MAXIMOFF.